(12) United States Patent
Jayapalan et al.

(10) Patent No.: US 11,558,509 B1
(45) Date of Patent: Jan. 17, 2023

(54) INTELLIGENT CALL ROUTING USING KNOWLEDGE GRAPHS

(71) Applicant: UIPCO, LLC, San Antonio, TX (US)

(72) Inventors: Vijay Jayapalan, San Antonio, TX (US); Jeffrey David Calusinski, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/458,682

(22) Filed: Aug. 27, 2021

Related U.S. Application Data

(60) Provisional application No. 63/071,705, filed on Aug. 28, 2020.

(51) Int. Cl.
*H04M 3/523* (2006.01)
*H04M 3/51* (2006.01)
*G06F 40/40* (2020.01)

(52) U.S. Cl.
CPC .......... *H04M 3/5233* (2013.01); *G06F 40/40* (2020.01); *H04M 3/5175* (2013.01); *H04M 3/5237* (2013.01); *H04M 2203/408* (2013.01)

(58) Field of Classification Search
CPC ............ H04M 3/5233; H04M 3/5175; H04M 3/5237; H04M 2203/408
See application file for complete search history.

(56) References Cited

U.S. PATENT DOCUMENTS

2008/0192908 A1\* 8/2008 O'Keefe ............. H04M 3/5191
370/352
2015/0350446 A1\* 12/2015 Glass .................... H04N 7/141
379/265.09

\* cited by examiner

*Primary Examiner* — Thjuan K Addy
(74) *Attorney, Agent, or Firm* — Plumsea Law Group, LLC

(57) ABSTRACT

A system and method for intelligently routing calls between customers and agents. The system and method use knowledge graphs to generate route recommendations for a route selection system. The system uses dynamically selected objective functions to generate the route recommendations. The objective functions may be selected according to the intent of the call. The system and method can also be used to reroute ongoing calls when the intent of the call changes.

20 Claims, 12 Drawing Sheets

INTELLIGENT CALL ROUTING USING KNOWLEDGE GRAPHS

CROSS-REFERENCE TO RELATED APPLICATION

This application claims the benefit of U.S. Provisional Patent Application Ser. No. 63/071,705 filed on Aug. 28, 2020 and titled "Digital Companion for Task Assistance", the disclosure of which is incorporated by reference in its entirety.

TECHNICAL FIELD

The present disclosure generally relates to call routing, and in particular, to using artificial intelligence to facilitate call routing.

BACKGROUND

Call routing is a process of automatically routing incoming calls from customers to agents or representatives of a company or organization who can answer questions and help customers complete tasks. During call routing, incoming calls may move through multiple phases: a qualifying phase in which the purpose of the call is determined; a queueing phase during which the call is sent to a system that queues the incoming call along with many other incoming calls; and a distribution phase in which the calls are finally routed to available agents based on the queue and other criteria.

Different companies may use different call routing methods. Exemplary call routing methods include fixed order, skills-based routing, talk-time, and time-based. Each of these call routing methods assigns calls according to a single criteria (such as which agents have had spent the least amount of time talking with customer so far).

Currently, call routing systems use predefined scripts to classify user intent, using, for example, interactive voice response systems. The intent or context of a call is pre-mapped with target routes to different agent groups that may specialize in various tasks or knowledge domains. Agent selection is done using call distribution algorithms such as the longest available agent. And all agents that can be reached within a given queue are considered equal. Because the call routing is based on scripts, simple distribution algorithms, and agents are not considered as distinct (outside of perhaps their specialization), existing systems ultimately route callers to agents in a manner that promotes efficiency. However, routes selected in this manner may not be the most effective in generating desired call and/or business outcomes.

There is a need in the art for a system and method that addresses the shortcomings discussed above.

SUMMARY

In one aspect, a method of intelligently routing calls between users and agents includes steps of receiving a call from a user, determining an intent for the call from the user, retrieving a set of available agents that can receive the call from the user, determining, based on the determined intent for the call, an objective function for matching the user to an available agent in the set of available agents, and retrieving a route knowledge graph. The method also includes steps of providing, as input to the route knowledge graph, information about the intent, information about the set of available agents, and information about the objective function, and receiving, as output from the route knowledge graph, a route recommendation, where the route recommendation includes information about a recommended agent from the set of available agents. The method also includes steps of passing the route recommendation to a route selection system, and routing, based on a route selection provided by the route selection system, the call from the user to the recommended agent.

In another aspect, a method of intelligently rerouting calls between users and agents includes steps of receiving information about an ongoing call between a user and a first agent, and retrieving an initial intent for the ongoing call. The method also includes steps of processing the information about the ongoing call and determining an updated intent for the ongoing call between the user and the first agent, where the updated intent is different from the initial intent. The method also includes steps of retrieving a set of available agents that can receive a rerouted call from the user, determining, based on the updated intent for the call, an updated objective function for rerouting the call to one of the available agents in the set of available agents, and retrieving a route knowledge graph. The method also includes steps of providing, as input to the route knowledge graph, information about the updated intent, information about the set of available agents, and information about the updated objective function, and receiving, as output from the route knowledge graph, an updated route recommendation, where the updated route recommendation includes information about a second agent from the set of available agents. The method also includes a step of rerouting the call from the user to the second agent.

In another aspect, a system for intelligently routing calls between users and agents includes a device processor and a non-transitory computer readable medium storing instructions. The instructions are executable by the device processor to receive a call from a user, determine an intent for the call from the user, retrieve a set of available agents that can receive the call from the user, and determine, based on the determined intent for the call, an objective function for matching the user to an available agent in the set of available agents. The instructions are further executable to retrieve a route knowledge graph, provide, as input to the route knowledge graph, information about the intent, information about the set of available agents, and information about the objective function, and receive, as output from the route knowledge graph, a route recommendation, where the route recommendation includes information about a recommended agent from the set of available agents. The instructions are also executable to pass the route recommendation to a route selection system, and route, based on a route selection provided by the route selection system, the call from the user to the recommended agent.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the inven

DESCRIPTION OF EMBODIMENTS

Figure 1:
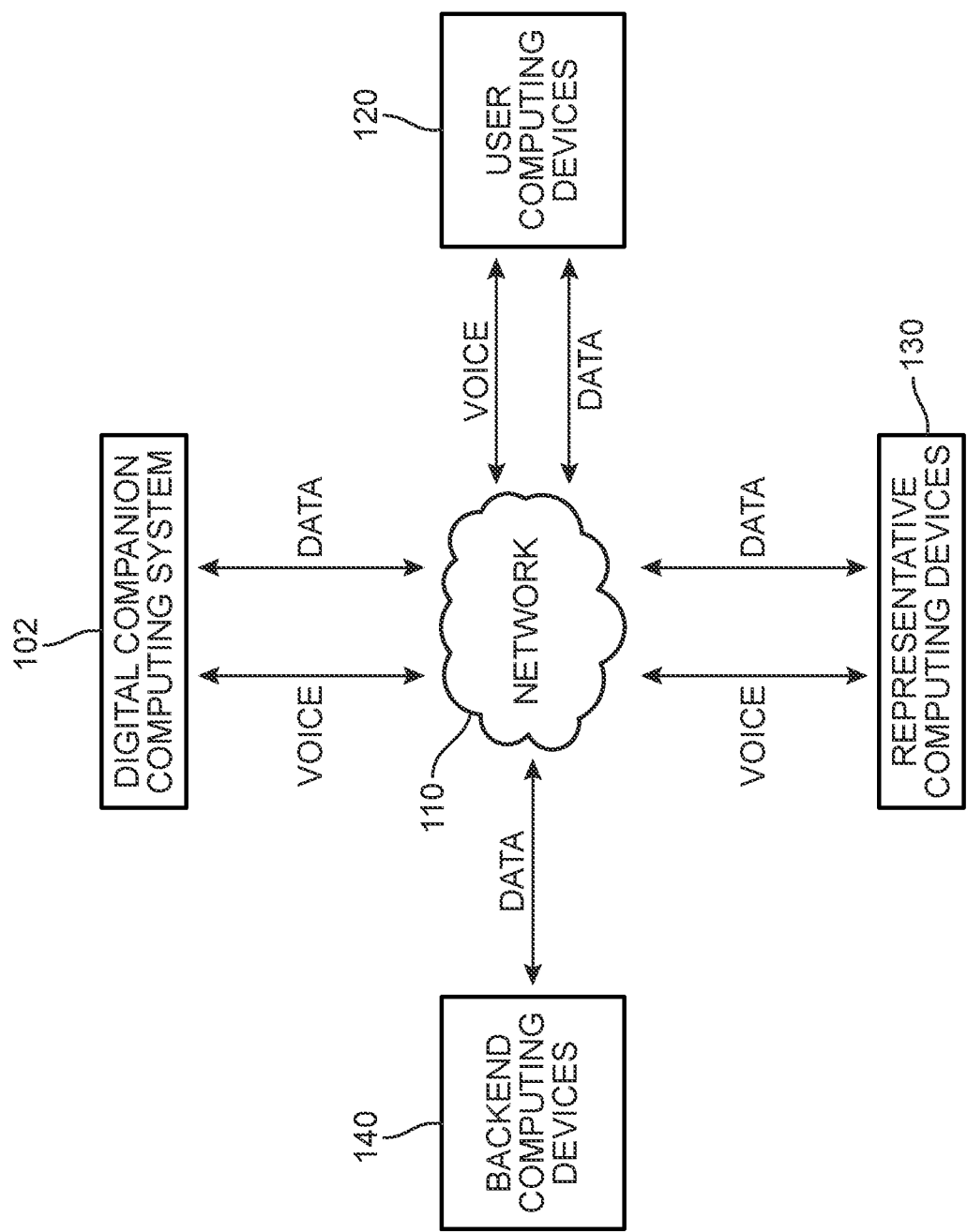
- FIG. 1 is a schematic view of a system for task assistance in a multi-channel domain, according to an embodiment.

The embodiments provide systems and methods that facilitate intelligent call routing by using routing algorithms that leverage machine learning models. The systems and methods use knowledge graphs that may be encoded, analyzed, and/or modified using graph neural networks, or other suitable algorithms.

By contrast with other call routing methods that utilize script-based intent classification during the qualifying phase of an incoming call, the exemplary systems and methods use machine learning models to create knowledge representations across users and agents for all interactions, conversations, and transactions. This allows for a substantially more dynamic method of determining caller intent, since different users may have different styles of communication and different levels of knowledge about what they need.

By contrast with other call routing methods that select agents for a call based on call distribution algorithms, the exemplary systems and methods use machine learning models to auto-encode user-system behavior and classify clusters of users and/or agents based on similarity. This allows for a system that can identify pairings between users and agents based on personalized features of the users and agents, thereby increasing the chances that users will be paired not only with agents that match their needs based on intent, but who may also be good personality matches to facilitate good conversational experiences for the users and agents.

By contrast with other call routing methods that treat all available agents reachable from a queue as equal, the exemplary systems and methods use machine learning models to classify user context, conversation, an objective function and other features of users and agents to compute a ranked list of routes that may best satisfy a desired business outcome. This allows users to be paired with agents that can best achieve desired business outcomes, which may improve the overall effectiveness of call center operations.

By contrast with other call routing methods where route effectiveness is a random distribution function of all available agents that satisfy the route (efficiency based distribution), the exemplary systems and methods operate so that route effectiveness is a function of business objectives such as sales, satisfaction, and engagement (effectiveness based distribution). Thus, the exemplary systems may act to optimize effectiveness of user-agent pairings in achieving various goals, rather than simply routing calls in the most efficient manner possible, which may save some time but may ultimately lead to less desirable outcomes for customers, agents, and/or a business or organization.

The example embodiments described herein make use of methods and systems in artificial intelligence. As used herein, "artificial intelligence" may include any known methods or techniques in machine learning and related fields. As examples, artificial intelligence may include systems and methods used in natural language processing (NLP) and similar fields.

The embodiments provide an intelligent system, or intelligent agent, that learns across multi-channel tasks. In one embodiment, the intelligent system can comprise part of a digital companion that can interface with users across one or more modalities, such as a web interface, voice, text, or other modalities. As an example, the digital companion can interact with a user both visually and through natural language speech. In some cases, the digital companion can interact with a user through both voice and through a commonly viewable digital interface (such as a webpage) simultaneously. That is, the digital companion can not only switch between interacting via voice and digital interfaces, but has contextual awareness of the entire process, giving the system a more comprehensive understanding of the tasks to be completed by the user. Moreover, the digital companion may adapt to a wide spectrum of user abilities on digital properties (such as websites and mobile applications) and provide task fulfilment capabilities. The digital companion would emulate the properties of a human task specialist combined with assisted digital interaction to facilitate operations such as co-browsing.

Conventional voice-based agents may act as oracles that provide answers in an audio modality for users. These voice-based agents may comprise a front end digital device (such as a phone or smart-speaker) which communicates with a back end that contains the logic for natural language processing and databases for querying answers to questions. Such agents lack contextual awareness outside of a particular Q&A session, which is typically initiated by a user with a key phrase (such as the device name or a pre-appended word, like "Hey").

Likewise, bots, or other digital assistants, may comprise systems that are focused on helping a user complete a single task. For example, a bot may be built into a webpage to help explain key information to a user or provide assistance in filling out a form. These bots may comprise artificial intelligences that are trained on a highly specific domain.

Because users of a webpage, for example, may not have the skills necessary to complete a given task, it is important that those users can interact with an agent using natural language.

The embodiments comprise a digital companion that provides true multi-modality across both voice and digital interfaces, so that a user can seamlessly transition between interacting with the digital companion via voice and through a digital interface. As an example, while a user is reviewing a bill from a credit card company, the user could activate the digital companion. The user could then ask the digital companion about specific charges on his or her bill. The digital companion, which has domain knowledge about the bill format and user specific data can then query one or more backend systems to gather additional information for the user. For example, if the user asks "is this debit for Duluth LLC a fraudulent charge," the digital companion could query a backend system and retrieve information about Duluth LLC, to determine if there are related companies or products associated with the company that the user might recognize, thereby making the charge less likely to be fraudulent.

The digital companion can be invoked in various ways. In some embodiments, the digital companion can be invoked using vocal commands, spoken either into a user's mobile device, such as a phone, an enabled smart-speaker, or directly into the microphone user's home computer. In some cases, the digital companion could be invoked by clicking on a button on a webpage. Thus, in tasks that take place across multiple channels, such as voice and digital interfaces, a user could invoke the digital companion from any channel.

FIG. 1 is a schematic view of a configuration of a digital companion and associated components the digital companion may interact with as part of a service platform. As seen in FIG. 1, a digital companion computing system 102, also referred to simply as digital companion 102, may interact with a variety of components and services across one or more networks 110. For example, digital companion 102 can interact with one or more user computing devices 120, with one or more representative computing devices 130, and with one or more backend computing systems 140.

Each computing system or computing device may be understood to include at least one processor, as well as one or more types of memory. Additionally, one or more computing systems or devices could communicate with one or more databases.

Figure 2:
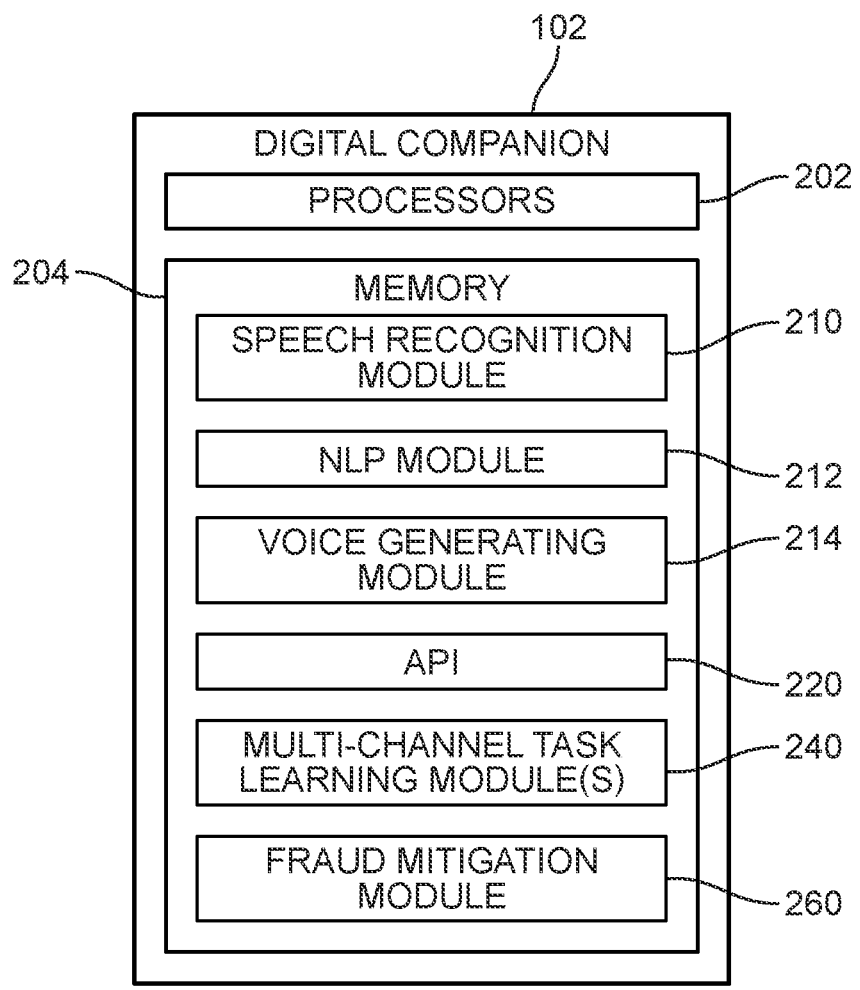
FIG. 2 is a schematic view of a digital companion, according to an embodiment.

As seen in FIG. 2, digital companion 102 can comprise a processor 202 and memory 204. Memory 204 may store instructions corresponding to various modules for performing multi-modal interactions. In one embodiment, digital companion 102 includes a speech recognition module 210, a natural language processing (NLP) module 212, and a voice generating module 214 for purposes of converting audio speech to text, extracting meaning from the converted text, and generating an audible response, respectively. Digital companion 102 also includes an application programming interface module (API) 220 that may be used to interface with one or more digital interfaces, such as websites, mobile web pages, native mobile applications or any other digital channels. For example, API 200 may be used to connect with an existing web session and retrieve data about what a user (or representative) may be seeing on the screen, input fields, and other relevant information.

Digital companion 102 may be configured to query backend computing systems 140 over network 110. This may be done to retrieve answers to questions asked by the user, or to answer questions generated by the system itself in the process of assisting the user.

To facilitate assisting users with tasks, digital companion 102 may comprise one or more multi-channel task learning module(s) 240. These various modules 240 may be associated with performing tasks, and could comprise models that have been trained via machine learning, heuristic or rule-based models. Once trained, the task learning module(s) 240 could then be deployed and used to facilitate real task assistance. In some cases, learning may be ongoing, with deployed systems continuing to learn in real time.

As described in further detail below, some embodiments may leverage the multi-modal task learning of the system to facilitate fraud detection and mitigation. In some embodiments, therefore, multi-channel task learning modules 240 could comprise one or more fraud detection modules. A fraud detection module may incorporate knowledge graphs, graph neural networks, as well as other suitable modules or components described in further detail below.

Additionally, in some cases, digital companion 102 could include a fraud mitigation module 260. Fraud mitigation module 260 may comprise one or more systems configured to take fraud limiting (or mitigating) actions. These include, for example, sending fraud alerts to customers via text, managing transaction verification requirements, limiting transactions amounts, and denying all transactions at a common merchant.

Multi-modal functionality may be acquired by training task learning modules on single channel domains, as well as on multi-channel domains. In some cases, a digital companion may be trained on scenarios that include multi-channel interactions. That is, the training data may comprise both voice data (or text) and training information specific to one or more specific tasks that occur within another channel, such as a digital interface.

Figure 3:
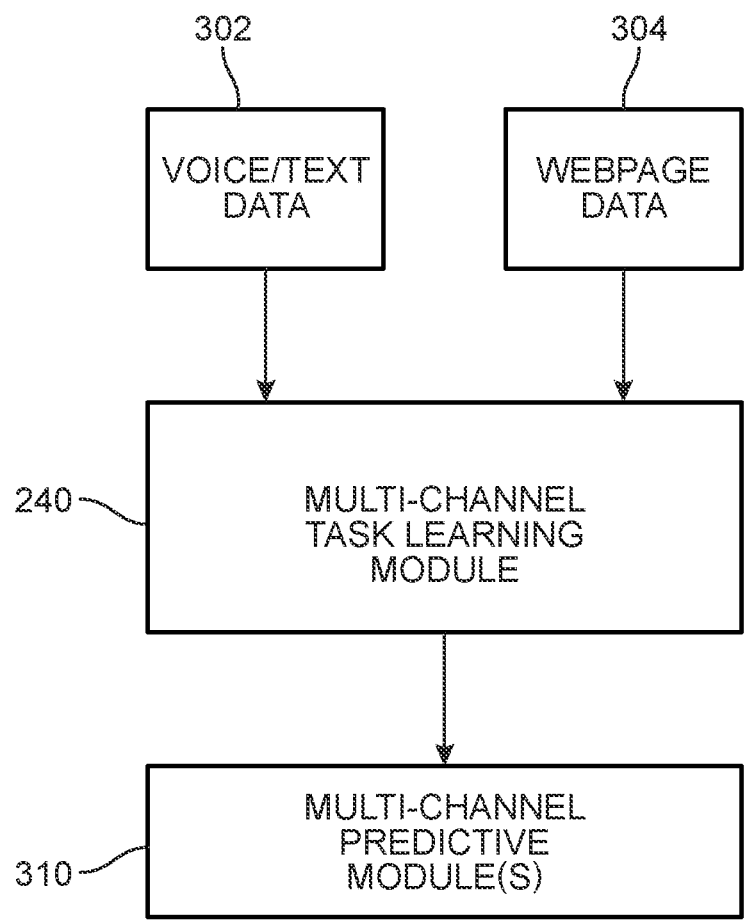
FIG. 3 is a schematic view of inputs and outputs to a multi-channel task learning module, according to an embodiment.

In the embodiment shown in FIG. 3, multichannel task learning module 240 may receive multi-channel inputs. These can include voice and/or text data 302, as well as webpage data 304. Voice and/or text data 302 may comprise any data related to conversations a user may have with an agent, either via voice or text-based chat. Webpage data 304 could include any information about a webpage, including form information, meta data, and any interactions that have performed by the user (or agent) on the webpage. In some cases, webpage data 304 could be provided as visual data that may be interpreted using machine learning or similar algorithms.

This training data could comprise data gathered over multiple channels as a representative helps guide the user in completing a task. The output of module 240 may be a multi-channel predictive model(s) 310 that can be used by the digital companion to help user's complete tasks. Specifically, the predictive model may take both speech/text and webpage data as inputs and provide predictive outputs that can be used by the digital companion to facilitate helping a user with a given task.

In operation, a digital companion could provide various kinds of assistance. In some cases, the digital companion could actively listen in on a call between a user and a representative, by leveraging its own natural language understanding. Then, when the user or representative invokes the digital companion, the digital companion could speak to one or both parties.

When a user has initiated a digital session, on a website, for example, the digital companion could be invoked from within the website. In some cases, for example, the digital companion could be invoked using a browser attachment that includes an "activation" button. To enhance user control, the system could be designed to ensure the digital companion can be separated from the digital session at any time by the user (and/or representative).

When engaged with a user's digital session, a digital companion could provide digital navigation and form filling on behalf of the user (or representative). Additionally, the behavior of the digital companion may be adaptive to the user's intent and skill.

Figure 4:
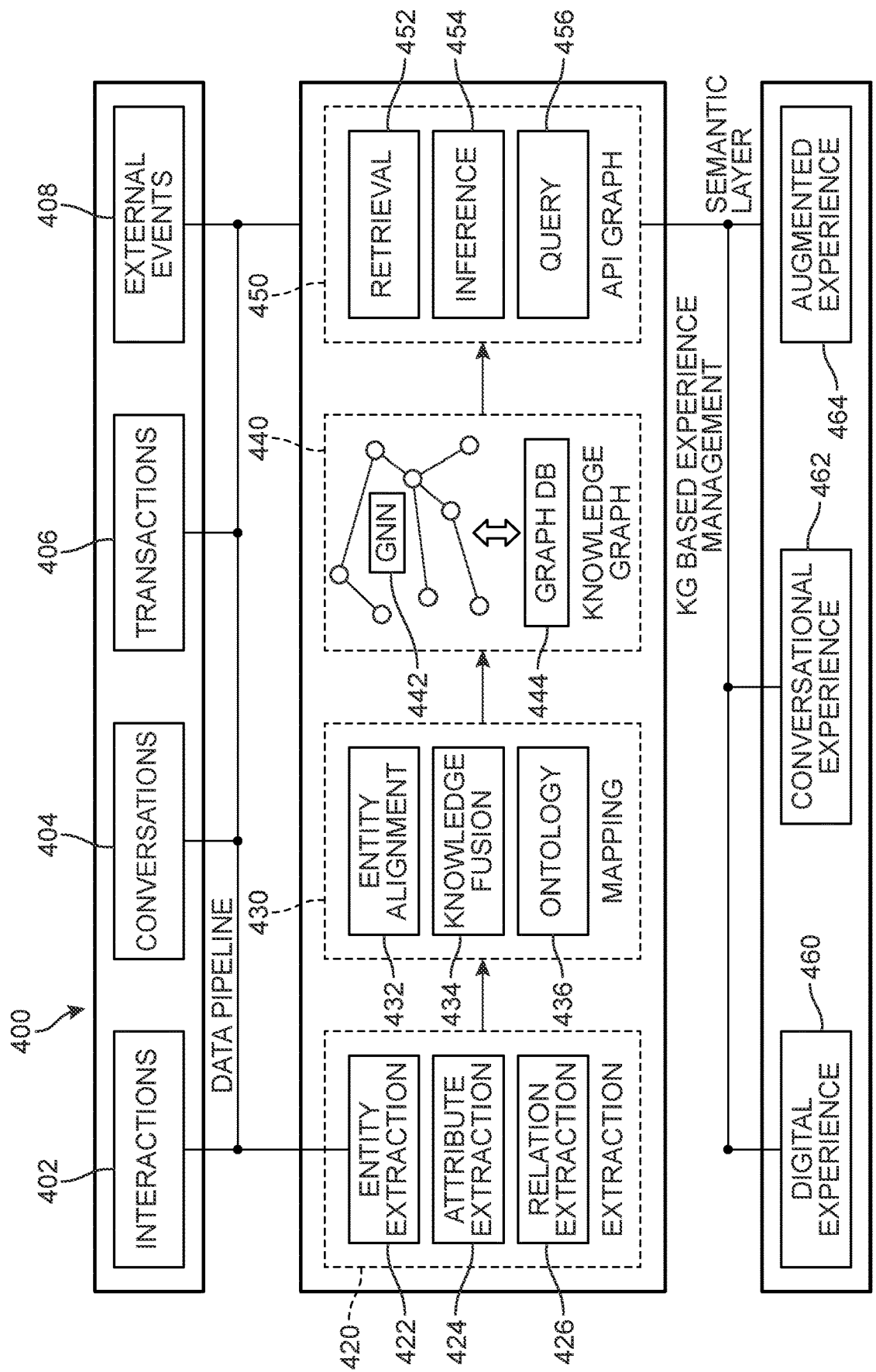
FIG. 4 is a schematic view of an architecture for a system that can take various kinds of inputs and dynamically manage a user's experiences, according to an embodiment.

FIG. 4 is a schematic view of a digital companion architecture 400 ("architecture 400"), according to an embodiment. As seen in FIG. 4, architecture 400 includes various sources of input. These may include, interactions 402, conversations 404, transactions 406, and external events 408. These include various modes or channels of communication between a digital companion and a customer, or other relevant party.

Data from multiple sources are collected within a data pipeline 410 and fed into an extraction module 420. Extraction module 420 may further include one or more sub-modules, such as entity extraction 422, attribute extraction 424, and relation abstraction 426.

Data processed by extraction module 420 and its various sub-modules, can be passed to a mapping module 430. Mapping module 430 may further include one or more sub-modules, such as entity alignment 432, knowledge fusion 434, and ontology 436.

The outputs of mapping module 430 are fed as inputs to a knowledge graph module 440. Knowledge graph module 440 may comprise a graph database 444. Knowledge graph module 440 may also comprise a graph neural network 442 that can be used to learn a suitable embedding of the graph data in graph database 444. Specifically, while the graph data may initially be represented within a high dimensional vector space, a graph neural network may help learn representations of the data in a (possibly continuous) low-dimensional vector space. Such low dimensional embeddings may allow a system to more readily detect relevant patterns that are obscured or simply undetectable when the data is represented within the higher dimensional vector space.

Outputs from knowledge graph module 440 may be passed to an application programming interface (API) graph module 450 ("API module 450"). API module 450 may further include several sub-modules, including retrieval module 452, inference module 454, and query module 456. In particular, once the graph data contained within knowledge graph module 440 has been transformed into a suitable embedding, the embedded representation of the data can be used to retrieve data, infer or predict new data, and/or query the knowledge graph for answers that can be found by looking at connections in the data. Of course it may be appreciated that the knowledge graph can be continually updated with new data, and that new, and possibly more suitable, embeddings can be learned as the knowledge grows or is otherwise modified.

Information from API graph module 450 can be made available for use in interfacing with customers or other users. In some embodiments, information available in API graph module 450 can be made available to a user's digital experience 460, a user's conversational experience 462, as well as a user's augmented experience 464.

Figure 5C:
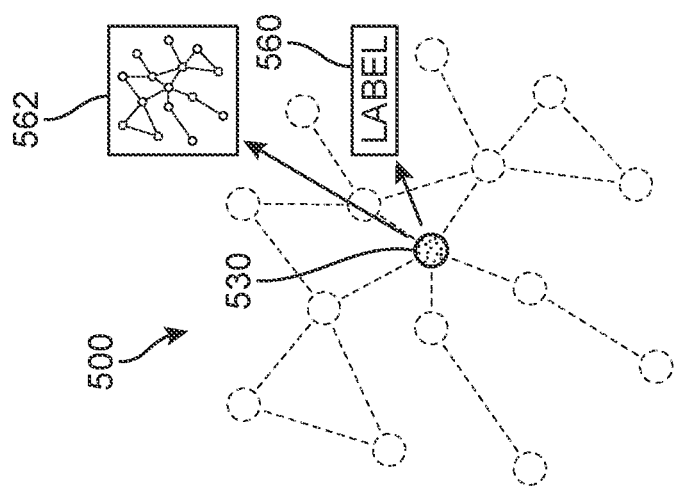
FIGS. 5A-C are schematic views of knowledge graphs, according to an embodiment.
Figure 5B:
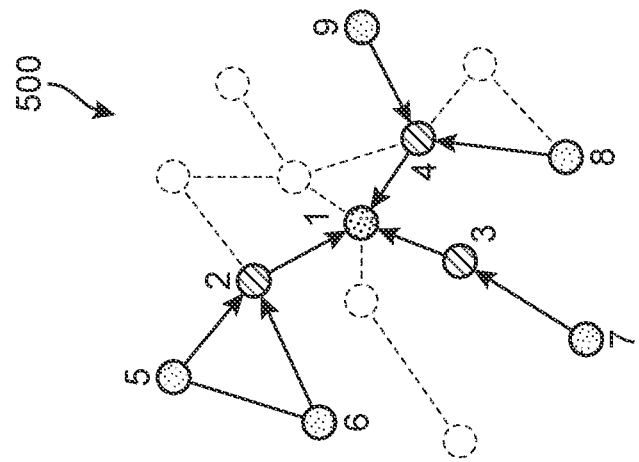
Figure 5A:
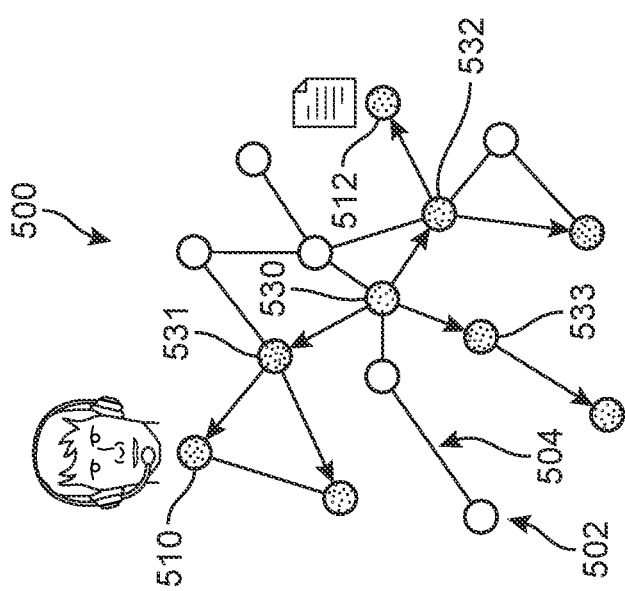

FIGS. 5A-C illustrated schematic views of a portion of a graph network 500 ("graph 500"), which is represented visually for reference. In this example, graph 500 includes multiple nodes 502 connected by edges 504. Each node may represent data corresponding to various events across different communication channels. As an example, a first node 510 comprises data corresponding to a transcript of a conversation between a customer and an agent of a call center. That is, first node 510 comprises data originating from a voice-based communications channel. As another example, a second node 512 comprises data corresponding to form data provided by a customer through a mobile application. That is, second node 512 comprises data originating from a mobile app-based communication channel.

It may be appreciated that data from different communication channels could have different structures. For example, a call center transcript may comprise lists of words. By contrast, form data received from a mobile app may be characterized by any combination of words and/or numbers that categorize the various possible inputs. Whereas the call center transcript comprises information from a conversation that is not necessarily constrained to a particular subject, the form data may comprise inputs whose values are constrained by the types of allowed inputs to the form and context about the form fields.

Because of the variety of data structures comprising graph 500, including data structures representing information from various different communication channels, the embodiments make use of knowledge graphs and associated graph neural networks to transform, organize, predict, and query data. As used herein, the term "graph neural network" refers to any neural network that uses graph structure to help in learning. In an exemplary configuration, nodes from graph 500 (which may comprise vectors of varying sizes) are mapped to an embedding space where latent features in the data (for example, hidden relationships) are more apparent.

Graph machine learning can make use of graphs of data to perform various tasks. Such tasks include, but are not limited to, node classification, link (or "edge") prediction, graph classification, and time series sequence prediction. These tasks can be achieved using one or more graph operations, which include, but are not limited to neighborhood searches, similarity, clustering, and transformation.

FIGS. 5A-C show a sequence for classifying the graph and/or predicting value(s) of a target node (node 530). Referring first to FIG. 5A, a sample neighborhood is selected for graph 500. This is a particular subset of the graph, where nodes are sufficiently close together according to a suitable metric. For example, a target node 530 has three adjacent nodes (node 531, node 532, and node 533). Each of these nodes has one or more adjacent nodes. In this example, the shaded nodes represent nodes that are sufficiently close together within the selected embedding space according to selected criteria, while the unshaded nodes represent nodes that may be related by other relationships that are not relevant within the selected embedding.

Once the sample neighborhood is selected, aggregate feature information from neighboring nodes are gathered (as in FIG. 5B) and used to predict a graph context (or class) label 562 and a label 560 for the target node 530. For reference, each node in the sample neighborhood in FIG. 5B is labeled with a number 1, 2, 3, 4, 5, 6, 7, 8, and 9.

Figure 6:
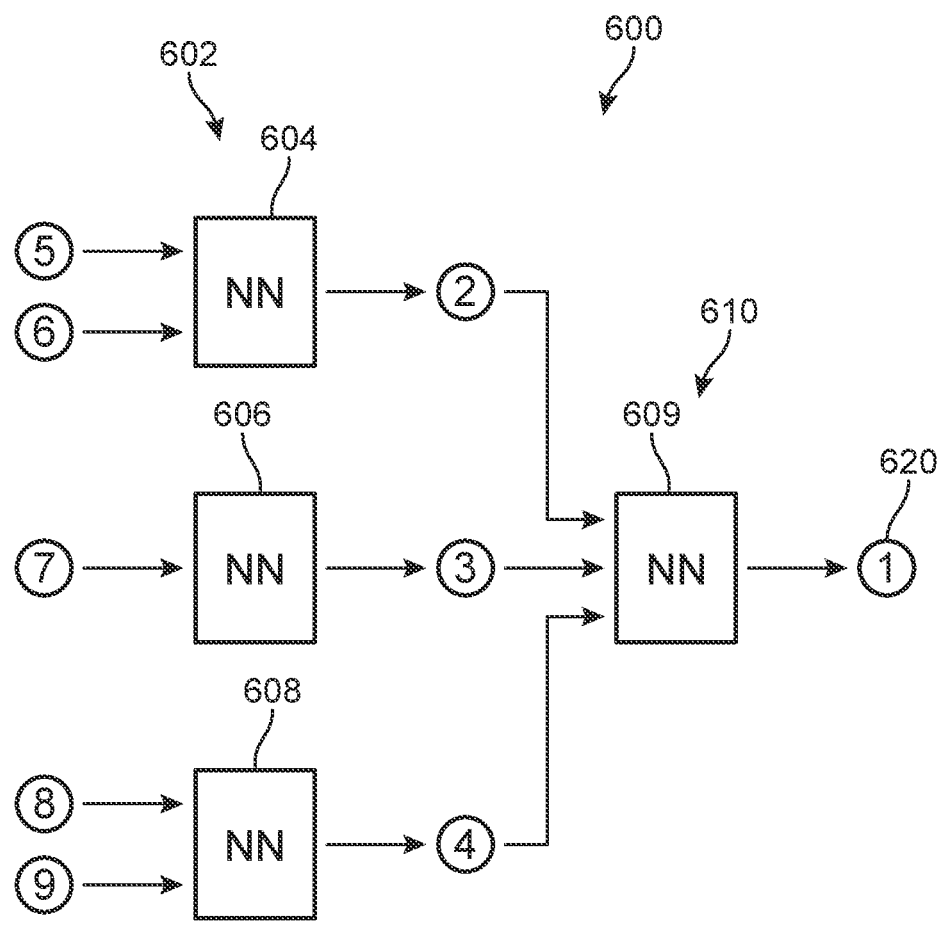
FIG. 6 is a schematic view of the use of a graph neural network for processing a graph of data, according to an embodiment.

FIG. 6 shows one exemplary method for assigning a label to a target node within a graph. Specifically, the architecture of FIG. 6 shows how data from each node is fed into a graph neural network 600 to predict a label for the target node (node "1") of FIG. 5B. Using the labeling of FIG. 5B, adjacent nodes are fed into multiple neural networks (network 604, network 606, and network 608) at a first layer 602. The outputs, which attempt to predict the values/labels at the nodes adjacent to the target node, are then fed into another neural network 609 at a second layer 610. For example, the values of node 5 and node 6 are fed as inputs into network 604 to predict the value of node 2. The final output 620 is a prediction for the value and/or label of the target node (that is, node "1").

Embodiments can use knowledge graphs to facilitate call routing between incoming callers and a set of agents. For example, in the example of FIG. 7, an organization may have a need to pair incoming calls between customers 702, also referred to as users, and available agents 704. For purposes of clarity, only a few customers and six agents are shown. However, it may be appreciated that in use, the number of simultaneously incoming calls can be in the hundreds, thousands, or even tens of thousands. The number of agents available any time (or within a selected time frame) may also be hundreds, thousands, or tens of thousands. Thus, pairing customers with available agents can quickly become a complex optimization task, even when the pairing criteria are relatively simple.

Figure 7:
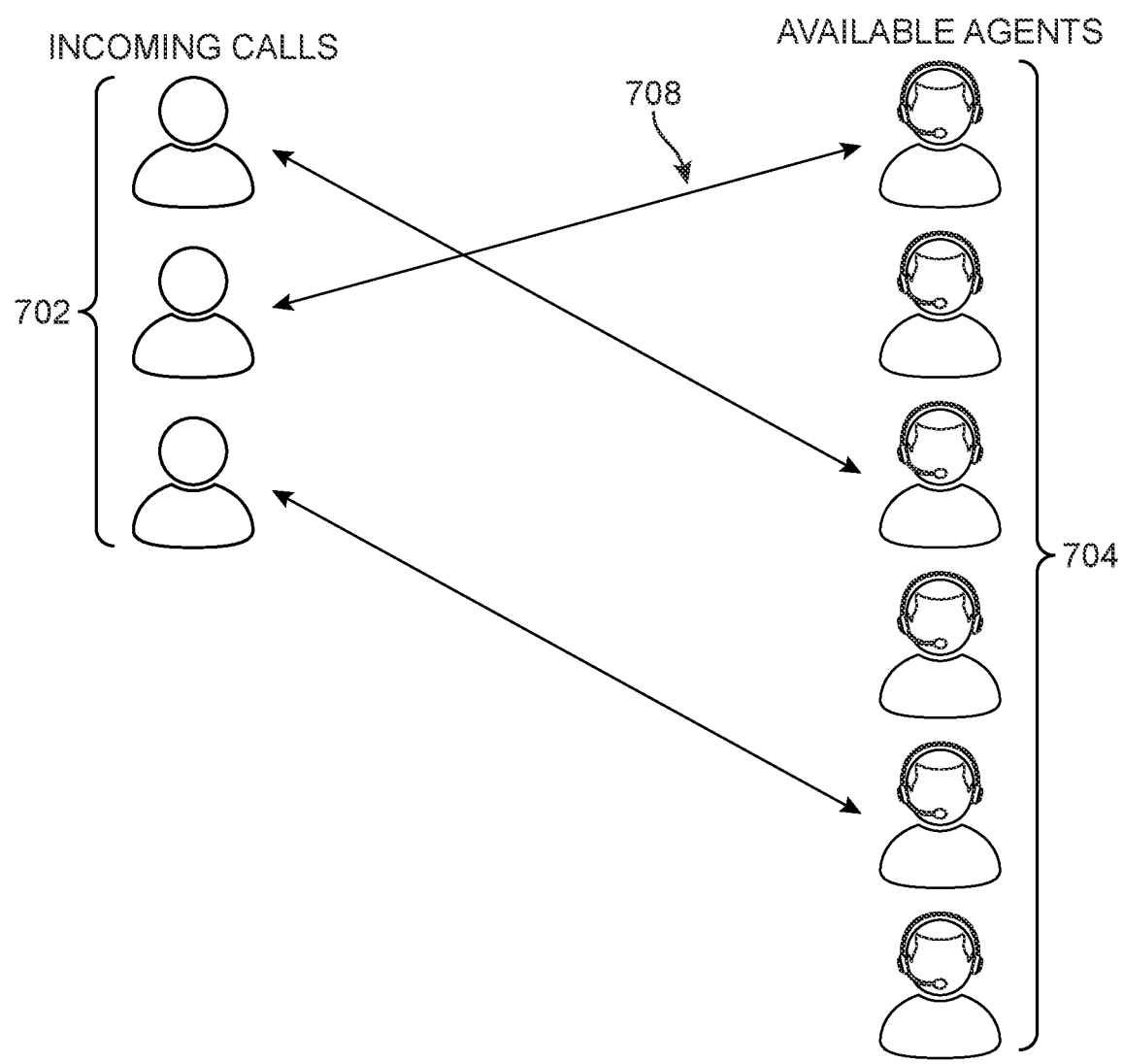
FIG. 7 is a schematic view of a set of pairings between incoming callers and available agents, according to an embodiment.

In FIG. 7, the ordering of customers may be representative of the time at which the incoming call was received, while the ordering of agents may be representative of the time at which the agent was first available. Rather than pairing customers with the first available agent, the embodiments use knowledge graphs to facilitate pairings 708 (indicated schematically with arrows) between customers and agents that maximize one or more metrics according to a variety of different input information, as described in further detail below.

Figure 8:
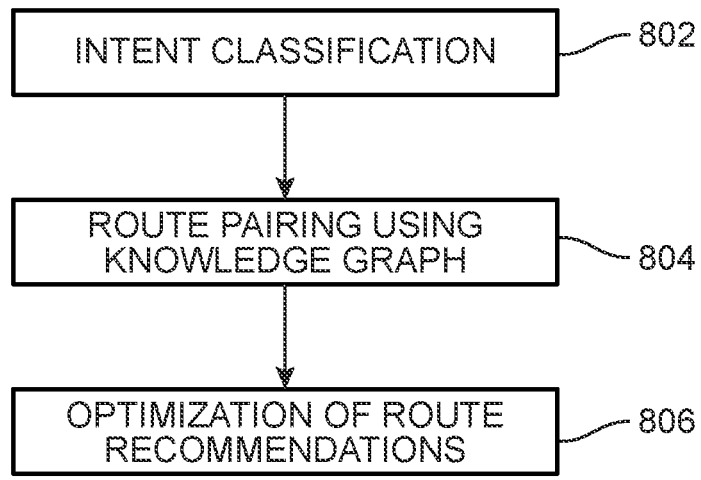
FIG. 8 is a schematic view of a process for call routing, according to an embodiment.

In order to facilitate pairing incoming calls with an appropriate agent, the embodiments can use a three-step process that is shown schematically in FIG. 8. In a first step 802, the system may perform intent classification. Intent classification may occur during an initial phase of a call. During this time, using an IVR (interactive voice response), a live agent, or some other digital assistant, the system can query the caller to determine their intent in calling. In a context where the caller is a banking customer calling into the bank's customer service center, the intent could include, but is not limited to: querying account transactions and balances, applying for a credit card, loan, or mortgage, asking for assistance with an ongoing loan or mortgage, or reporting fraudulent activity.

In some cases, intent can be determined using natural language processing (NLP) systems, including systems that can generate text from speech and provide natural language understanding of the text. For example, a system could pick up key words such as "credit card" and "enroll" and determine that the caller's intent is to speak with an agent about enrolling in one of the bank's credit card offerings.

Once an intent for the call has been determined, the system could proceed to step 804, which comprises route pairing using a knowledge graph. The output of step 804 is a route recommendation. A route recommendation may include a subset or ranking of all available agents that may be paired with a selected customer associated with an incoming call. For example, a route recommendation for a selected customer could be a list of five agents from the set of all agents that provide the best "match" to the customer according to selected criteria. In some cases, the list of agents could be ranked.

In step 806 the system optimizes routes based on the routing recommendations determined in step 804. In particular, a route selection system is used to select final customer-agent pairings (routes) for all incoming calls based on an optimized schedule that may consider route recommendations across many customers in a manner that avoids collisions between pairs. For example, if a selected agent is ranked as the best match for two different customers, the route selection system may match one of the two customers with a different agent that was also well matched to that customer.

Figure 9:
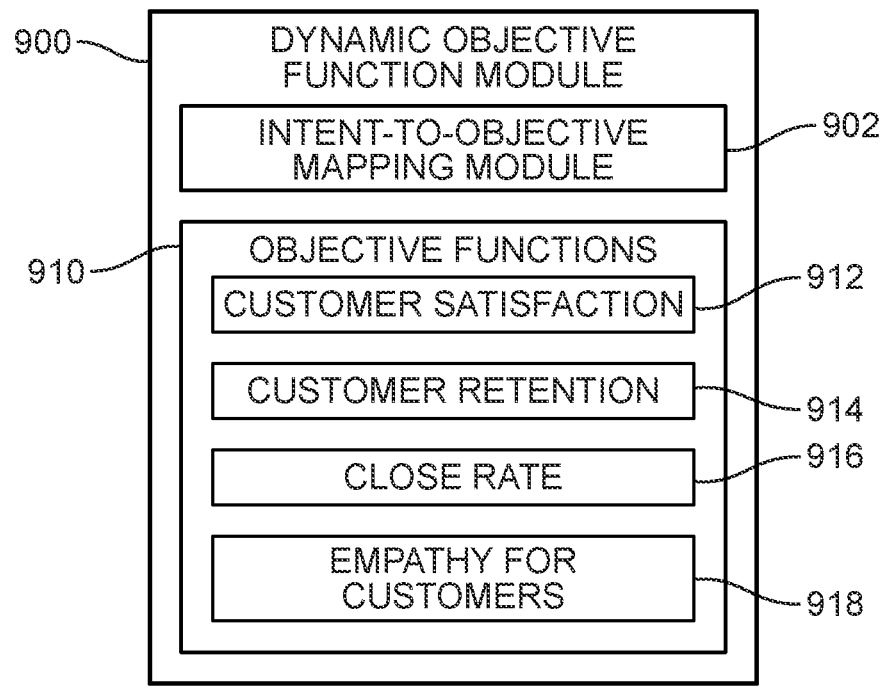
FIG. 9 is a schematic view of an embodiment of a dynamic objective function module.

FIG. 9 is a schematic view of a dynamic objective function module 900, which facilitates dynamic selection of objective functions, based on the intent of a call. Dynamic objective function module 900 may include a set of possible objective functions 910. As an example, the embodiment of FIG. 9 includes four different objective functions, including a first objective function 912 ("customer satisfaction"), a second objective function 914 ("customer retention"), a third objective function 916 ("close rate"), and a fourth objective function 918 ("empathy for customers").

Dynamic objective function module 900 further includes an intent-to-objective mapping module 902 ("mapping module 902"). Mapping module 902 may map different intents to different objective functions, such as objective functions 910. For example, if a system determines that a caller has questions about his or her mortgage, the system may dynamically select first objective function 912, which corresponds to selecting a customer-agent pairing that will tend to maximize the customer's satisfaction with the call. If the system determines that a caller has questions about a credit card, the system may dynamically select second objective function 914, which corresponds to selecting a customer-agent pairing that will tend to maximize customer retention.

Figure 10:
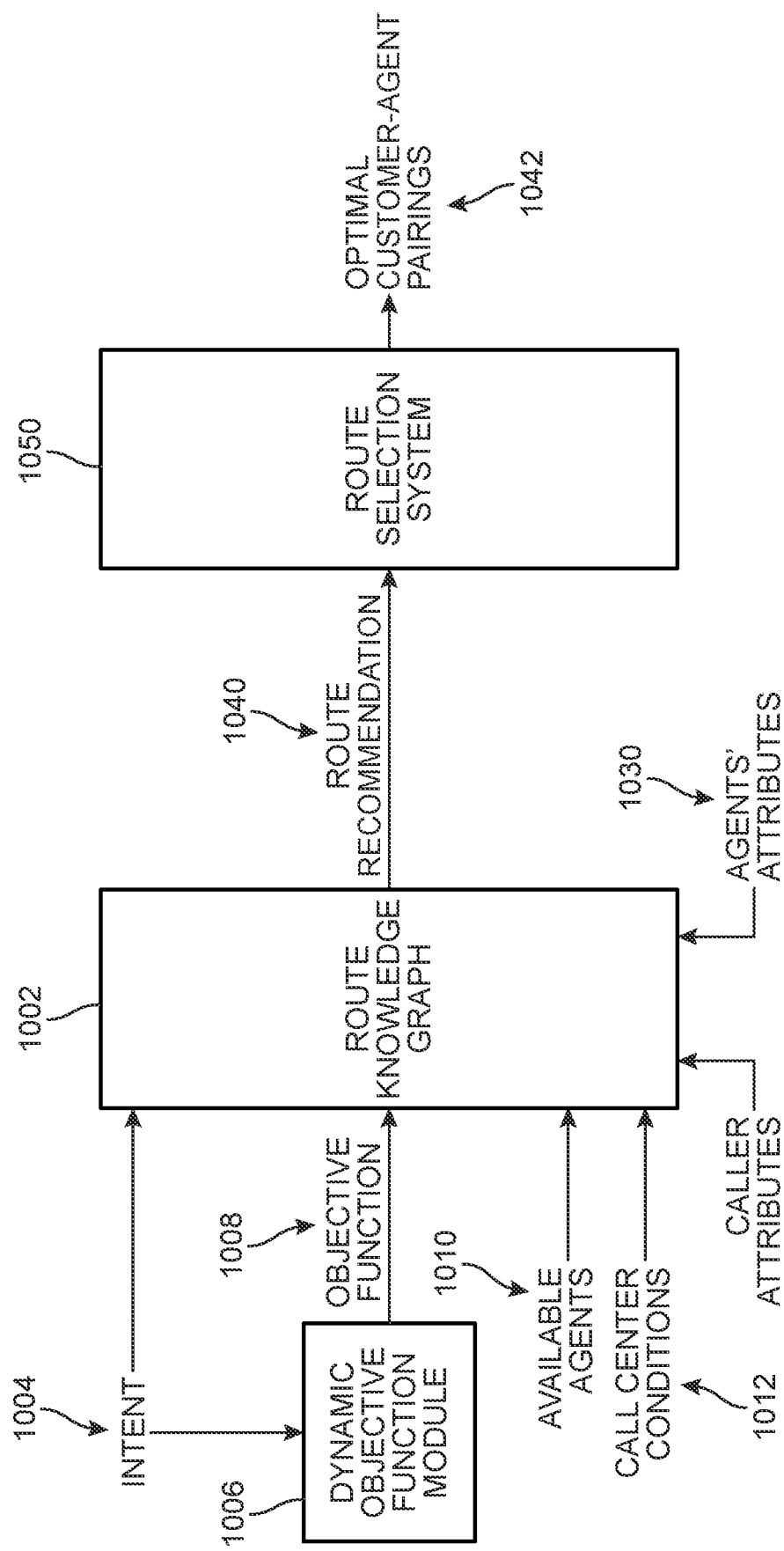
FIG. 10 is a schematic view of an architecture for a call routing system using a route knowledge graph, according to an embodiment.

FIG. 10 is a schematic view of an architecture for intelligent call routing, according to an embodiment. As seen in FIG. 10, several inputs are fed into a route knowledge graph 1002. As described herein, a "route knowledge graph" is a knowledge graph that can be utilized to predict or otherwise generate route recommendations. In some cases, a route knowledge graph can be represented within an embedding space using a graph neural network, as already described above.

Inputs to route knowledge graph 1002 can include intent 1004, which can be determined using, for example, a conversational agent or IVR system. Intent 1004 may be used as a direct input into route knowledge graph 1002. Additionally, intent 1004 may be used as an input to dynamic objective function module 1006, which generates a dynamically selected objective function 1008 as output. Objective function 1008 can then be used as an input to route knowledge graph 1002.

Inputs to route knowledge graph 1002 can also include a set (or list) of available agents 1010. That is, available agents 1010 comprise agents that are currently available to receive calls.

In some embodiments, route knowledge graph 1002 can also receive call center conditions 1012 as inputs. Such inputs may be relevant when a large number of agents are localized at one or more call centers. Call center conditions could include, but are not limited to, call volume at the call center, information about phone and/or internet outages, business hours at the call center, as well as other suitable information.

In some cases, information about a caller (that is, the customer) can be included as caller attributes 1020. Examples of caller attributes that could be considered by the system include, but are not limited to, a customer's income, a customer's demographic, a customer's home location, professional status, marital status, as well as other suitable information that may be stored as part of a customer profile by one or more parties. In some cases, this data could be passed to route knowledge graph 1002 as a feature vector.

In some cases, information about the set of available agents can be included as agents' attributes 1030. Examples of agent attributes that could be considered by the system include, but are not limited to, the agent's tenure, the agent's skills, the types of calls the agent is best at answering, the types of calls the agent is worst at answer, the agent's close rate, as well as other suitable information. In some cases, this data could be passed to route knowledge graph 1002 as a feature vector. In some cases, there may be a separate feature vector for each available agent.

Using the inputs described herein, route knowledge graph 1002 may be used to generate a route recommendation 1040. This may be accomplished by performing operations on route knowledge graph 1002, which has been updated to include information about the caller intent, a dynamically selected objective function, a set of available agents, call center conditions, caller attributes, and agents' attributes.

Route recommendation 1040 includes information about a subset of agents that may be most suitable for pairing with a particular caller (customer). In some cases, the route recommendation can comprise a list of suitable agents. In other cases, the route recommendation can comprise a ranking of agents.

Once generated, route recommendation 1040 is passed to route selection system 1050, which finds optimal customer-agent pairings 1042 based on route recommendations for multiple different customers. Performing this final process of route selection (and dispatch) helps avoid potential collisions that could occur since different route recommendations may recommend pairing different customers with the same agent simultaneously.

Figure 11:
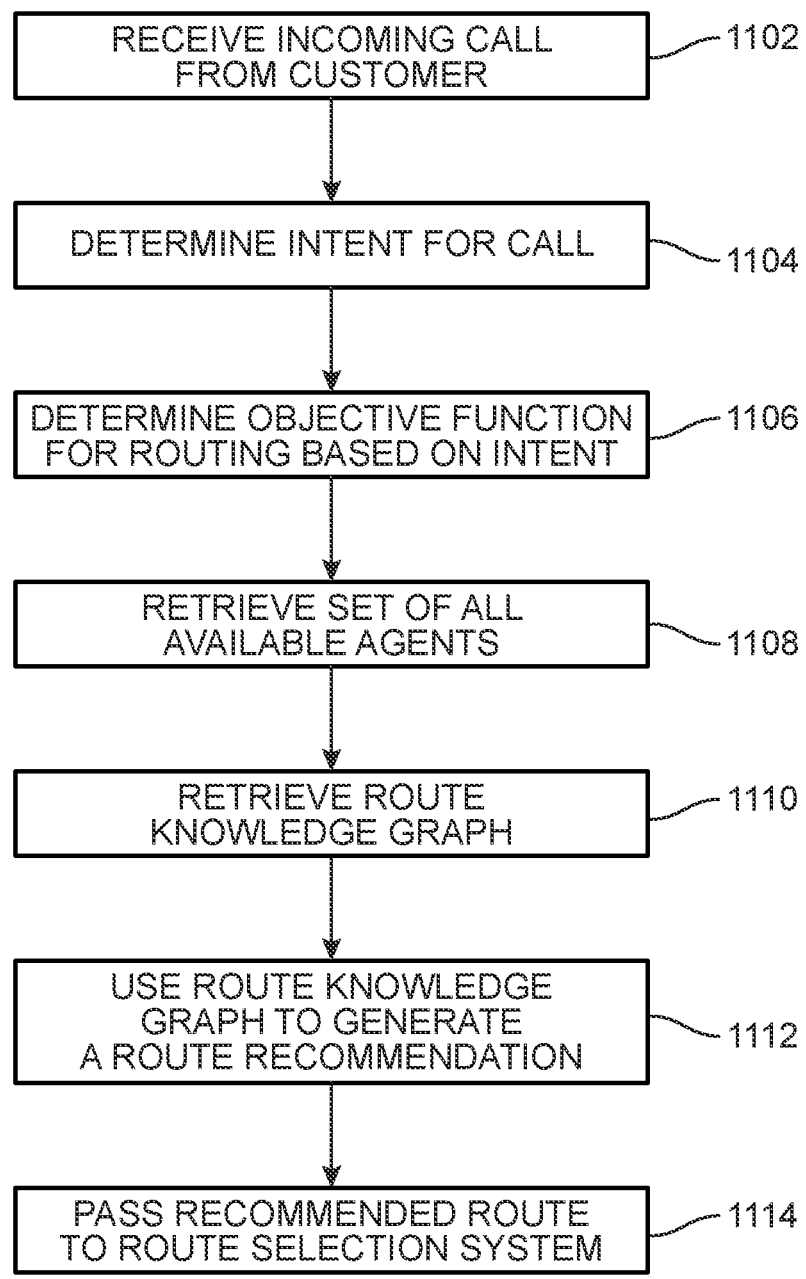
FIG. 11 is a schematic view of a call routing method, according to an embodiment.

FIG. 11 is a schematic view of a process for routing calls between customers and agents, according to one embodiment. Starting in step 1102, the system may receive an incoming call from a customer. In step 1104, the system may determine the intent for the call. In step 1106, the system may determine an objective function for routing the call based on the intent determined in step 1104. In step 1108, the system may retrieve a set of available agents and in step 1110, the system may retrieve a route knowledge graph.

In step 1112, the system uses the route knowledge graph to generate a route recommendation based on at least the intent, the objective function, and the set of available agents. Moreover, it may be appreciated that the route knowledge graph may also make use of feature vectors including information about the caller/customer and about the set of available agents, in order to provide the most suitable pairings between customers and agents.

Finally, in step 1114, the system passes the route recommendation generated in step 1112 to a route selection system. The route selection system then dispatches the calls so that each customer is routed to an agent according to an optimized caller-agent pairing.

Figure 12:
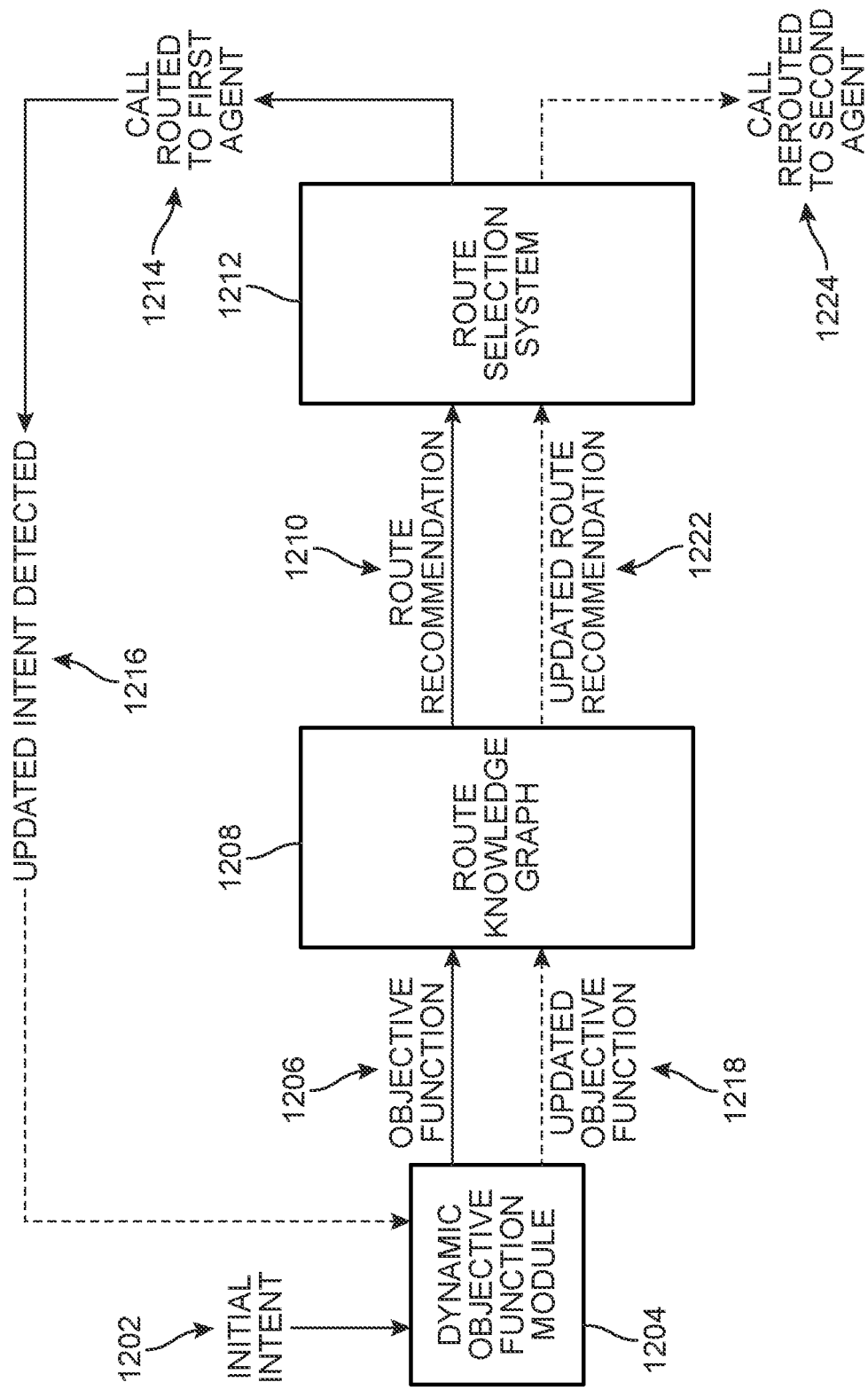
FIG. 12 is a schematic view of an architecture for a call routing system, according to another embodiment.

Embodiments can include provisions for rerouting calls between customers and agents in real time, according to situations where the intent of a given call has changed and a customer may be better paired with another available agent. In the architecture of FIG. 12, a call may be initially routed to a first agent as follows. An initial intent 1202, determined when the customer first calls, is identified and used as input to a dynamic objective function module 1204 to generate an initial objective function 1206. Objective function 1206 is fed as input to route knowledge graph 1208, along with possibly other inputs, such as those described above and shown in FIG. 10. Using the initial objective function and possibly other inputs, route knowledge graph 1208 generates an initial route recommendation 1210. Route selection system 1212 receives route recommendation 1210 and dispatches the call to a first agent (call routing 1214).

At this point, the system may listen to the ongoing call between the customer and the first agent. During this conversation, the intent for the call may change. For example, a customer may originally call to inquire about a credit card but may end up deciding they need to talk to an agent about a mortgage. In this case, the first agent may no longer be the best match for the customer's intent, as compared to all available agents. Thus, the system could detect this updated intent 1216 during the call. This may be fed back into dynamic objective function module 1204, which may generate an updated objective function 1218 for matching the customer with an agent. For example, the initial objective function could be call retention, while the updated objective function could be customer satisfaction. Updated objective function 1218 is used to update route knowledge graph 1208, which may then generate an updated route recommendation 1222. Route selection system 1212 receives updated route recommendation 1222 and generates a new customer-agent pairing. Route selection system 1212 then reroutes the customer to a second agent (rerouting 1224).

Figure 13:
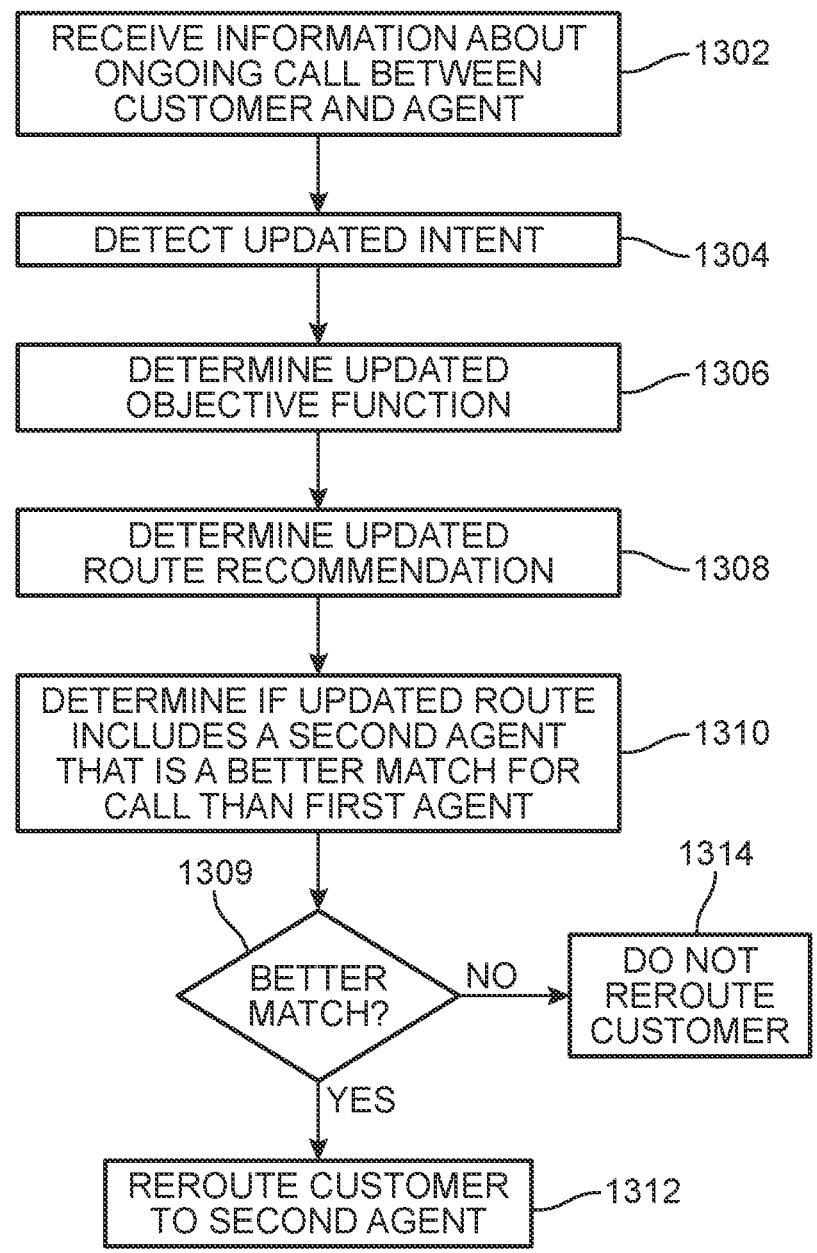
FIG. 13 is a schematic view of call routing method, according to another embodiment.

FIG. 13 is a schematic view of a process for rerouting customers to a new agent when the intent of the call changes during a conversation with an initial agent. Starting in step 1302, the system may receive information about an ongoing call between a customer and a first agent. In step 1304, the system can process information about the ongoing call and detect an updated intent for the call. That is, the system can determine that the intent for the call has changed from the initial intent identified when the customer first called in.

In step 1306, the system can determine an updated objective function based on the updated intent. In step 1308, the system can use a route knowledge graph to determine an updated route recommendation. In step 1310, the system can determine if the updated route recommendation includes a second agent that is a better match than the current first agent. For example, in some cases, the system may include the current agent (first agent) in the set of available agents that is checked based on the updated intent. In such a case, the first agent may be returned as part of the route recommendation. If the first agent is ranked ahead of all other recommended agents, the system may determine no better match exists. If there is another agent ranked ahead of the first agent (for example, the second agent), or if the first agent is not recommended at all according to the updated route recommendation, the system may determine that there is a better match.

The system checks if there is a better match at step 1309. If so, the system proceeds to step 1312 to reroute the customer to the second agent. Otherwise, the system proceeds to step 1314 where the customer is not rerouted. That is, the customer is left to talk to the first agent even though the intent of the call has changed, since the system has determined that the first agent is still a good match for the customer based on the updated intent.

Rerouting could be accomplished automatically by the system, or in cooperation with the current agent talking with the user. For example, the system could send a message to the first agent to indicate that a better match has been found. At that point the system could prompt the agent to tell the caller that another agent is available with more expertise in a particular area and give the caller the option to be rerouted.

In some embodiments, more than one objective function could be used simultaneously to facilitate customer-agent pairing. In such cases, multiple objective functions could be combined and optimized so that the sum of the functions is greater than a calculated penalty between competing objectives.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. Examples of media that can be used for storage include erasable programmable read-only memory (EPROM), electrically erasable programmable read-only memories (EEPROM), solid state drives, magnetic disks or tapes, optical disks, CD ROM disks and DVD-ROM disks.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

For each of the exemplary processes described above including multiple steps, it may be understood that other embodiments some steps may be omitted and/or reordered. In some other embodiments, additional steps could also be possible.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A method of intelligently routing calls between users and agents, the method comprising:
receiving a call from a user;
determining an intent for the call from the user;
retrieving a set of available agents that can receive the call from the user;
determining, based on the determined intent for the call, an objective function for matching the user to an available agent in the set of available agents;
retrieving a route knowledge graph;
providing, as input to the route knowledge graph, information about the intent, information about the set of available agents, and information about the objective function;
receiving, as output from the route knowledge graph, a route recommendation, wherein the route recommendation includes information about a recommended agent from the set of available agents;
passing the route recommendation to a route selection system; and
routing, based on a route selection provided by the route selection system, the call from the user to the recommended agent.

2. The method according to claim 1, wherein the route recommendation includes information about a plurality of recommended agents that could be paired with the user.

3. The method according to claim 2, wherein the route recommendation includes a ranked list of available agents.

4. The method according to claim 1, wherein the method includes providing information about the user to the route knowledge graph, and wherein the method further includes providing information about the set of available agents to the route knowledge graph.

5. The method according to claim 1, wherein determining the objective function comprises using a module that generates different objective functions in response to receiving different intents as inputs.

6. The method according to claim 1, further comprising:
receiving information about an ongoing call between the user and the recommended agent;
processing the information about the ongoing call and determining an updated intent for the ongoing call between the user and the recommended agent;
retrieving an updated set of available agents that can receive a rerouted call from the user;
determining, based on the updated intent for the call, an updated objective function;
retrieving a route knowledge graph;
providing, as input to the route knowledge graph, information about the updated intent, information about the updated set of available agents, and information about the updated objective function;
receiving, as output from the route knowledge graph, an updated route recommendation; and
rerouting the call from the user to a second recommended agent.

7. The method according to claim 6, wherein the updated route recommendation is different from the route recommendation.

8. The method according to claim 6, wherein the method further includes providing the recommended agent with an option to reroute the call to the second recommended agent.

9. A method of intelligently rerouting calls between users and agents, the method comprising:
receiving information about an ongoing call between a user and a first agent, and retrieving an initial intent for the ongoing call;
processing the information about the ongoing call and determining an updated intent for the ongoing call between the user and the first agent, wherein the updated intent is different from the initial intent;
retrieving a set of available agents that can receive a rerouted call from the user;

determining, based on the updated intent for the call, an updated objective function for rerouting the call to one of the available agents in the set of available agents;

retrieving a route knowledge graph;

providing, as input to the route knowledge graph, information about the updated intent, information about the set of available agents, and information about the updated objective function;

receiving, as output from the route knowledge graph, an updated route recommendation, wherein the updated route recommendation includes information about a second agent from the set of available agents; and rerouting the call from the user to the second agent.

10. The method according to claim 9, wherein the updated route recommendation includes information about a plurality of recommended agents that could be paired with the user.

11. The method according to claim 10, wherein the method includes providing information about the user to the route knowledge graph, and wherein the method further includes providing information about the set of available agents to the route knowledge graph.

12. The method according to claim 9, wherein determining the updated objective function comprises using a module that generates different objective functions in response to receiving different intents as inputs.

13. The method according to claim 9, wherein processing the information about the ongoing call comprises using natural language processing.

14. A system for intelligently routing calls between users and agents, comprising:

a device processor;

a non-transitory computer readable medium storing instructions that are executable by the device processor to:

receive a call from a user;

determine an intent for the call from the user;

retrieve a set of available agents that can receive the call from the user;

determine, based on the determined intent for the call, an objective function for matching the user to an available agent in the set of available agents;

retrieve a route knowledge graph;

provide, as input to the route knowledge graph, information about the intent, information about the set of available agents, and information about the objective function;

receive, as output from the route knowledge graph, a route recommendation, wherein the route recommendation includes information about a recommended agent from the set of available agents;

pass the route recommendation to a route selection system; and route, based on a route selection provided by the route selection system, the call from the user to the recommended agent.

15. The system according to claim 14, wherein the route recommendation includes information about a plurality of recommended agents that could be paired with the user.

16. The system according to claim 15, wherein the route recommendation includes a ranked list of available agents.

17. The system according to claim 14, wherein the instructions are further executable to provide information about the user to the route knowledge graph, and provide information about the set of available agents to the route knowledge graph.

18. The method according to claim 14, wherein the instructions are further executable to use a module that generates different objective functions in response to receiving different intents as inputs.

19. The system according to claim 14, wherein the instructions are further executable to monitor ongoing calls between users and agents and reroute calls when an intent of the call changes.

20. The system according to claim 19, wherein the instructions are further executable to generate an updated route recommendation when the intent of the call changes.

* * * * *